(12) United States Patent
Tang et al.

(10) Patent No.: US 11,854,043 B2
(45) Date of Patent: *Dec. 26, 2023

(54) ONLINE MARKETPLACE COOPERATIVE PROMOTIONAL PLATFORM

(71) Applicant: ETSY, Inc., Brooklyn, NY (US)

(72) Inventors: Maxwell Tang, Brooklyn, NY (US); Nicholas Daniel, Brooklyn, NY (US)

(73) Assignee: ETSY, INC., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,740

(22) Filed: Dec. 19, 2022

(65) Prior Publication Data

US 2023/0122467 A1   Apr. 20, 2023

Related U.S. Application Data

(63) Continuation of application No. 17/680,598, filed on Feb. 25, 2022, now Pat. No. 11,556,954, which is a continuation of application No. 16/820,971, filed on Mar. 17, 2020, now Pat. No. 11,295,342.

(60) Provisional application No. 62/827,277, filed on Apr. 1, 2019.

(51) Int. Cl.
   *G06Q 30/00* (2023.01)
   *G06Q 30/0241* (2023.01)
   *G06Q 30/0242* (2023.01)

(52) U.S. Cl.
   CPC ..... *G06Q 30/0249* (2013.01); *G06Q 30/0244* (2013.01); *G06Q 30/0276* (2013.01)

(58) Field of Classification Search
   None
   See application file for complete search history.

(56) References Cited

U.S. PATENT DOCUMENTS

| 2014/0122237 A1 | 5/2014 | Thierer et al. |
| 2016/0267527 A1* | 9/2016 | Flood ................. G06Q 30/0246 |
| 2018/0053224 A1* | 2/2018 | McClave ............... G06Q 50/01 |

* cited by examiner

*Primary Examiner* — Alvin L Brown
(74) *Attorney, Agent, or Firm* — Botos Churchill IP Law LLP (57) ABSTRACT

An on-line marketplace provides systems and methods for a mutually beneficial messaging campaign with one or more merchants, in order to promote the merchants' products. One aspect of the messaging campaign includes augmenting the merchants' budgets across multiple commercial channels. The channels may include merchant-operated channels, marketplace-operated channels, and/or third party channels. The marketplace selects when and how to augment the merchants' budgets. The augmented budget comprises an overall content budget for the messaging campaign, including a first budget portion provided by the merchant(s) and a second budget portion provided by the on-line marketplace. The augmented budget may be determined based on a weighted combination of goals of the marketplace and one or more merchants. The augmented budget may be segmented into static and dynamic portions, in which the dynamic portion is varied between channels to determine variables to optimize budget allocation and message performance.

23 Claims, 9 Drawing Sheets

702 Receive information from a merchant device regarding a messaging campaign for a merchant, the information including at least one of a budget or an outcome-related goal for the messaging campaign 704 Identify one or more clusters of products from the merchant to promote via multiple platforms 706 Select the multiple platforms on which to promote the product clusters, the platforms being selected from the group consisting of a marketplace platform, a merchant platform and one or more third party service provider platforms 708 Set an overall content budget for the messaging campaign, including a first budget portion provided by the merchant and a second budget portion provided by the on-line marketplace 710 Allocate the overall content budget among the multiple platforms, including allocating the first budget portion and the second budget portion among the platforms 712 Transmit content associated with the messaging campaign for the product cluster(s) to each platform in accordance with the allocated overall budget

ONLINE MARKETPLACE COOPERATIVE PROMOTIONAL PLATFORM

CROSS-REFERENCE TO RELATED APPLICATIONS

This application is a continuation of U.S. application Ser. No. 17/680,598, filed Feb. 25, 2022, which is a continuation of U.S. application Ser. No. 16/820,971, filed Mar. 17, 2020 and issued as U.S. Pat. No. 11,295,342 on Apr. 5, 2022, which claims the benefit of the filing date of U.S. Provisional Application No. 62/827,277, filed Apr. 1, 2019, the entire disclosures of which are incorporated by reference herein.

BACKGROUND

Merchants and other providers of goods and services may have a web-based presence to reach a large target audience. Such providers may sell to customer directly, through third party websites, or both. A program may be employed with internal and third party sites in an attempt to maximize messaging to the target audience and a return on investment for a given budget, for messages such as advertising. However, it may be difficult for a merchant or other provider, especially a small business with limited resources, to determine an effective messaging program and spend allocation. This can lead to overspending or underspending, missed opportunities and a lower return on investment.

BRIEF SUMMARY

Aspects of the technology enable merchants and an on-line marketplace to cooperatively invest in a mutually beneficial promotional program. The on-line marketplace may augment the budgets of one or more merchants for use in a single set of automated campaigns. The set of campaigns applies the augmented budgets across multiple commercial channels. The commercial channels may include merchant-operated channels, marketplace-operated channels, and/or third party channels. The marketplace may choose when and how to augment the merchants' budgets according to a budget balancer, which is able to subsidize and optimize sellers' budgets across multiple content channels. The modified budget may be determined based on a weighted combination of goals of the marketplace and one or more merchants, where the weighted combination may be obtained via machine learning signals both internal and external to the merchants. The modified budget may be segmented into static and dynamic portions, the dynamic portion being varied between channels to determine variables to optimize budget allocation and message performance. This approach is mutually beneficial for the merchants and the marketplace, for instance by bringing more customer awareness to the sellers' merchandise and increasing the likelihood of potential purchases. It is also more efficient for merchants such as small businesses, which can benefit from the data analytics employed by the marketplace without having to invest extensive time or resources into how best to target their own campaigns.

According to one aspect of the technology, a method is provided. The method comprises receiving, by one or more processors of a marketplace server system of an on-line marketplace, information from a merchant device regarding a messaging campaign for a merchant, the information including at least one of a budget or an outcome-related goal for the messaging campaign; identifying, by the one or more processors, one or more clusters of products from the merchant to promote via multiple platforms; selecting, by the one or more processors, the multiple platforms on which to promote the one or more clusters of products, the multiple platforms being selected from the group consisting of a marketplace platform associated with the on-line marketplace, a merchant platform associated with the merchant, and one or more third party service provider platforms; setting, by the one or more processors, an overall content budget for the messaging campaign, the overall content budget including a first budget portion provided by the merchant and a second budget portion provided by the on-line marketplace; allocating, by the one or more processors, the overall content budget among the multiple platforms, including allocating the first budget portion among the multiple platforms and allocating the second budget portion among the multiple platforms; and transmitting, by the one or more processors, content associated with the messaging campaign for the one or more clusters of products to each of the multiple platforms in accordance with the allocated overall content budget.

In one example, receiving the information includes receiving information for a plurality of merchants. Here, each merchant of the plurality of merchants has a corresponding messaging campaign. In this case, the first budget portion of the overall content budget includes an individual budget for each of the plurality of merchants. The second budget portion from the on-line marketplace may be allocated equally for each of the plurality of merchants. Alternatively, the second budget portion from the on-line marketplace is allocated unequally for each of the plurality of merchants.

In another example, the messaging campaign includes a defined timeframe for promotion of the one or more clusters of products. Here, the method further comprises modifying the overall content budget during the defined timeframe. In one scenario, modifying the overall content budget includes rebalancing the second budget portion by either increasing or decreasing the second budget portion for selected ones of the multiple platforms. The increasing or decreasing the second budget portion for selected ones of the multiple platforms may include either increasing or decreasing the second budget portion according to a selected budget percentage or a selected budget amount. In another scenario, the second budget portion has an aggregate value allocated among the multiple platforms, and the rebalancing maintains the aggregate value of the second budget portion. In a further scenario, the rebalancing holds a first percentage of budget spend fixed across the multiple platforms and varies a second percentage of the budget spend among selected ones of the multiple platforms, the first and second percentages adding to 100% of the budget.

In yet another example, the method further comprises determining one or more times during the defined timeframe to modify the overall content budget. Here, determining the one or more times during the defined timeframe to modify the overall content budget may include evaluating one or more dates associated with a recognized holiday.

In a further example, the method also comprises modifying at least the second budget portion of the overall content budget based on one or more jurisdictional criteria.

In another example, the method further comprises tracking performance of the messaging campaign according to one or more identified metrics. Here, the method may include receiving the one or more identified metrics from one or more of the multiple platforms. In one scenario the method further comprises modifying at least the second budget portion of the overall content budget based on tracking the performance of the messaging campaign. And in another scenario the method further comprising transmitting at least a portion of the tracked performance to the merchant device.

And in another example, setting the overall content budget further includes segmenting the overall content budget into static and dynamic portions. In this case, the dynamic portion is varied between selected ones of the multiple platforms to determine one or more variables to optimize budget allocation and message performance of the messaging campaign.

According to another aspect of the technology, a marketplace server system of an on-line marketplace is provided. The system is configured to distribute content associated with a messaging campaign for one or more merchants across multiple platforms. The system comprises at least one database configured to store information including one or more of merchant data, product listings for sale, promotional content, and analytics information, and one or more processors operatively coupled to the at least one database. The one or more processors form a front-end subsystem, an optimization subsystem, and a content promotion distribution subsystem. The front-end subsystem is configured to receive information from a merchant device regarding the messaging campaign for a given merchant. The information includes at least one of a budget or an outcome-related goal for the messaging campaign. The optimization subsystem is configured to identify, based on the information in the at least one database, one or more clusters of products from the given merchant to promote via multiple platforms. It is also configured to select the multiple platforms on which to promote the one or more clusters of products. The multiple platforms are selected from the group consisting of a marketplace platform associated with the on-line marketplace, a merchant platform associated with the given merchant, and one or more third party service provider platforms. The optimization subsystem is further configured to set an overall content budget for the messaging campaign. The overall content budget includes a first budget portion provided by the given merchant and a second budget portion provided by the on-line marketplace. And the optimization subsystem is also configured to allocate the overall cement budget among the multiple platforms, including allocate the first budget portion among the multiple platforms and allocate the second budget portion among the multiple platforms. The content promotion distribution subsystem is configured to transmit content associated with the messaging campaign for the one or more clusters of products to each of the multiple platforms in accordance with the allocated overall content budget.

In one example, the optimization subsystem includes a subsidy optimizer configured to identify the one or more clusters of products from the given merchant to promote, and a budget balancer configured to set the overall content budget and to allocate the overall content budget among the multiple platforms.

In another example, the optimization subsystem is further configured to track performance of the messaging campaign according to one or more identified metrics, and to modify at least the second budget portion of the overall content budget based on the performance tracked of the messaging campaign.

DETAILED DESCRIPTION

Example System

Embodiments of the present disclosure are described in detail with reference to the accompanying figures wherein like reference numerals identify similar or identical elements. It is to be understood that the disclosed embodiments are merely examples of the disclosure, which may be embodied in various forms.

Figure 1:
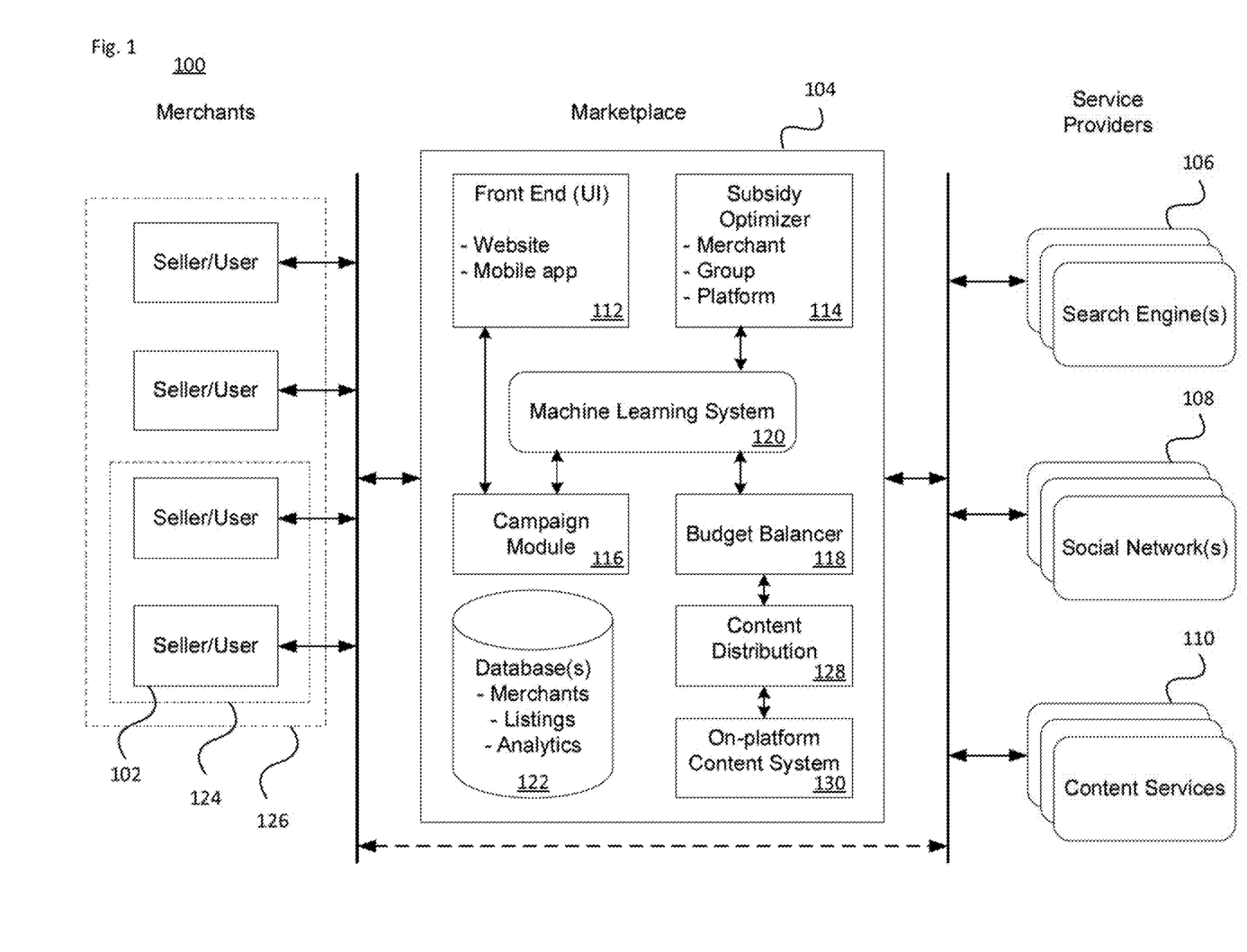
FIG. 1 illustrates an example marketplace arrangement in accordance with aspects of the disclosure.

FIG. 1 illustrates an example arrangement 100, which includes merchants employing at least one end user device, an on-line marketplace server system, and third party service providers employing a plurality of servers, in communication over a network. The on-line marketplace server system may include specialized processor clusters for machine learning and intensive computational applications. As shown, the merchants may be, e.g., sellers, (including other users who use marketplace services but may not directly sell on the platform) 102, who may communicate directly or indirectly with the marketplace 104 and/or service provides such as search engines 106, social networks 108, and content services 110 such as ad networks or systems, video content providers, etc. The merchants may offer various goods and services for sale to potential customers through their own platform (e.g., website or mobile app), the marketplace's platform, and/or platforms of various third party or off-site service providers.

In conjunction with this, a given merchant may implement a campaign to advertise their goods or services selected platforms, for instance to highlight a particular product or a group of products. The merchant may offer a promotion, such as free shipping, a discount, a coupon, etc. On non-merchant platforms, there may be fees charged to list products, complete a transaction (sale), handle payment processing, shipping and the like. Content promotion fees may also be charged on one or more bases, such as cost-per-click (CPC), cost-per-impression (CPI), cost-per-conversion, etc.

The merchant may set a budget for their campaign across all platforms. The budget may be, e.g., on a daily, weekly, monthly, seasonal or holiday basis. For instance, on a daily basis the merchant may allocate 30% of the budget to the marketplace platform, 40% to social network platforms, 20% to search engine platforms, and 10% to a video-based content service platform. The merchant has the flexibility to increase or decrease the budget, reallocate across various platforms, turn advertising features on and off, set various bidding criteria (e.g., a maximum cost-per-click for some or all of their goods), etc. Results of the campaign can be evaluated to determine a return on advertising spend (ROAS) in view of actual sales. In this way, the merchant can manually evaluate how successful the campaign is, and can modify the current campaign or plan a future campaign accordingly.

However, for small businesses and other merchants with limited resources, it can be challenging to plan and run a campaign across multiple platforms. According to one aspect of the technology, the marketplace may assist merchants with campaigns in various ways that are beneficial to both the merchants and the marketplace. For instance, as shown in FIG. 1 the marketplace 104 may have a robust suite of systems and features that can help to maximize ROAS and other metrics such as, for example cost per click, cost per impression, or cost per action, or a weighted combination of the above for a set of merchants and/or the marketplace as a whole. As illustrated, the marketplace has a front end 112 including a website and/or a mobile app for client devices, which may be accessible to both sellers and potential customers. The front end 112 can provide a user interface (UI) for sellers to list their goods for sale and make pricing, promotional and other adjustments as needed. It can also include a UI for customers to search for and purchase items of interest. The UI may provide images, text, audio and/or video content associated with a particular item, and may provide an application programming interface (API) for direct access to sales, pricing, and promotional functions.

A subsidy optimizer module 114 determines how to subsidize campaigns for individual merchants, groups of merchants, and different platforms according to information received and evaluated by the marketplace. This information can include analytics data about the merchants, promotion goals and merchant budgets, as well as marketplace goals and budgets. The subsidy optimizer can also include external information regarding external factors that may relate to a product or merchant, such as, for example, events, locations, product and merchant trends, weather, or data on similarly situated merchants. For example, based on a cyclical analysis of past data regarding return on advertising spend for similarly situated merchants, balanced against seasonality, product type, and differences between third party platform performance, predictive optimal budgets are determined, and a subsidy is applied to selected merchants to bridge the difference between a merchant's actual budget and the merchant's optimal budget.

A campaign module 116 is configured to receive information from sellers about their campaign using one or more queries. The campaign module 116 may be part of or separate from the UI of the front end 112. In one example, the campaign module 116 receives merchant messages via the front end UI. The campaign module 116 provides activation or deactivation of a content promotion service for the merchant. The campaign module 116 is also configured to receive from the merchant at least one of a promotion budget, promotion goal, or a request to start or stop a promotion service.

A budget balancer module 118 determines an overall content budget for the merchant(s) and the marketplace. This includes determining an allocation among multiple platforms. In one example, the allocation is between the marketplace's platform and platforms of one or more third party service providers, such as search engines 106, social networks 108 and/or content services 110. In a further example, the allocation is between the merchant's own platform, the marketplace's platform and platforms of one or more third party service providers. The allocation process may include evaluating analytics data collected or processed by the subsidy optimizer module 114. In one example, the budget balancer module 118 is part of the subsidy optimizer module 114, and one or both of these modules may be part of an optimization subsystem of the marketplace server system. Based on the results of the subsidy optimizer module 114, the budget balancer module 118 supplements the budget of one or more merchants as applied to the marketplace or one or more third party advertising platforms. In addition, the subsidy optimizer module 114 may segment the budget into static and dynamic portions. Here, the dynamic portion is varied between selected channels to determine variables and channel budget responses, which can be used by the marketplace system to optimize budget allocation and message performance. For example, for a subsidized budget for a merchant, 80% may be statically allocated among the marketplace and two third party platforms. The other 20% may be dynamically varied over time, in increments of, e.g., +/−1% per 24 hour period, between the three allocations to determine a yield curve or variance. Information about the yield curve and/or variance may then be used to increase or decrease the allocations. This will further enable the system to optimize budget spend based on a goal of the merchant(s), the marketplace, or both.

A machine learning system 120 employs information from the subsidy optimizer module 114, campaign module 116, the budget balancer module 118 and one or more databases 122 to create clusters, such as proximal groups of listings (e.g., goods or services for sale) or merchants. For instance, a first subset of merchants may form one cluster as shown by dash-dot line 124, while a second subset of merchants may form a second cluster as shown by dashed line 126. The first cluster may comprise merchants that all offer the same category or vertical of goods (e.g., jewelry), while the second cluster may comprise merchants that have complementary categories of goods (e.g., jewelry, candy and flowers). The subsidy optimizer module 114 and/or the budget balancer module 118 may employ the clusters and other information generated by the machine learning system 120 (e.g., heuristics related to merchants, verticals, customers, complaints, etc.) when determining how to subsidize campaigns or determining an overall content budget. The database(s) 122 may include information about merchants registered with the marketplace, including user identifiers, associated content, merchant shop and listing quality and/or risk data, and associated meta information and relevance factors for the associated content. The database(s) 122 may also include information about specific listings, advertising and other promotional content, and/or analytics information relating to transaction information and return on investment (ROI) information, such as ROAS, conversion rates, etc.

The marketplace 104 may also include a content distribution module 128 and an on-platform content system 130. The content system 130 may comprise an ad server configured to provide advertisements or other content as part of a campaign that includes the marketplace's platform. The content distribution module 128 employs output of the budget balancer module 118 to optimize the distribution of content. In one example, this may include the content distribution module 118 directing requests to different content systems to present promoted content based on an apportioned allocation of the overall content budget to the respective content systems. Here, a first request is provided to a first content system, such as the on-platform content system 130. A second request is provided to an off-platform content system, which may be associated with the platform of a particular third party service provider (e.g., a search engine 106, a social network 108 and/or a content service 110).

These and other aspects of the technology are discussed further below.

Figure 2A:
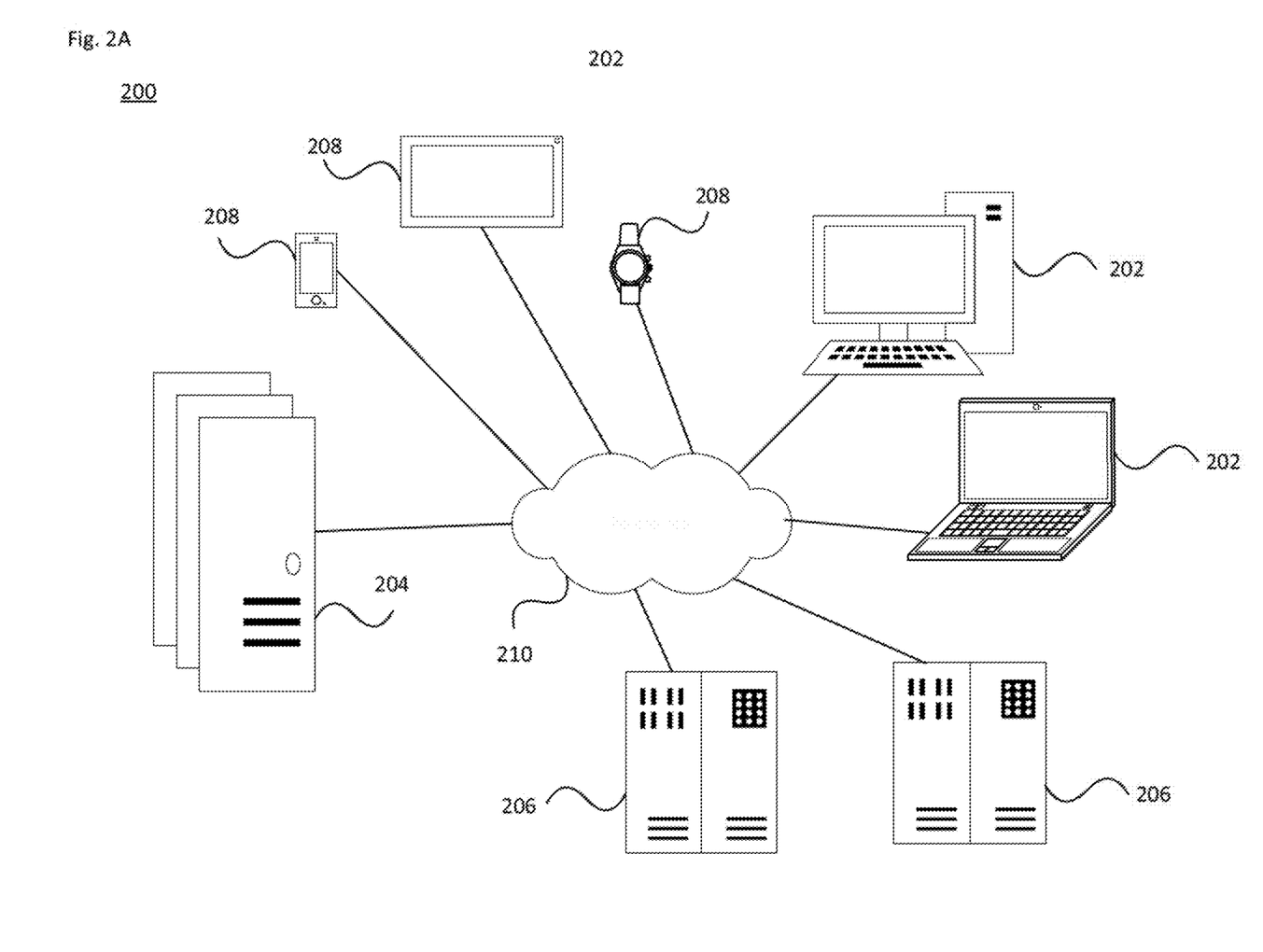
FIGS. 2A-B illustrate an example system in accordance with aspects of the disclosure.
Figure 2B:
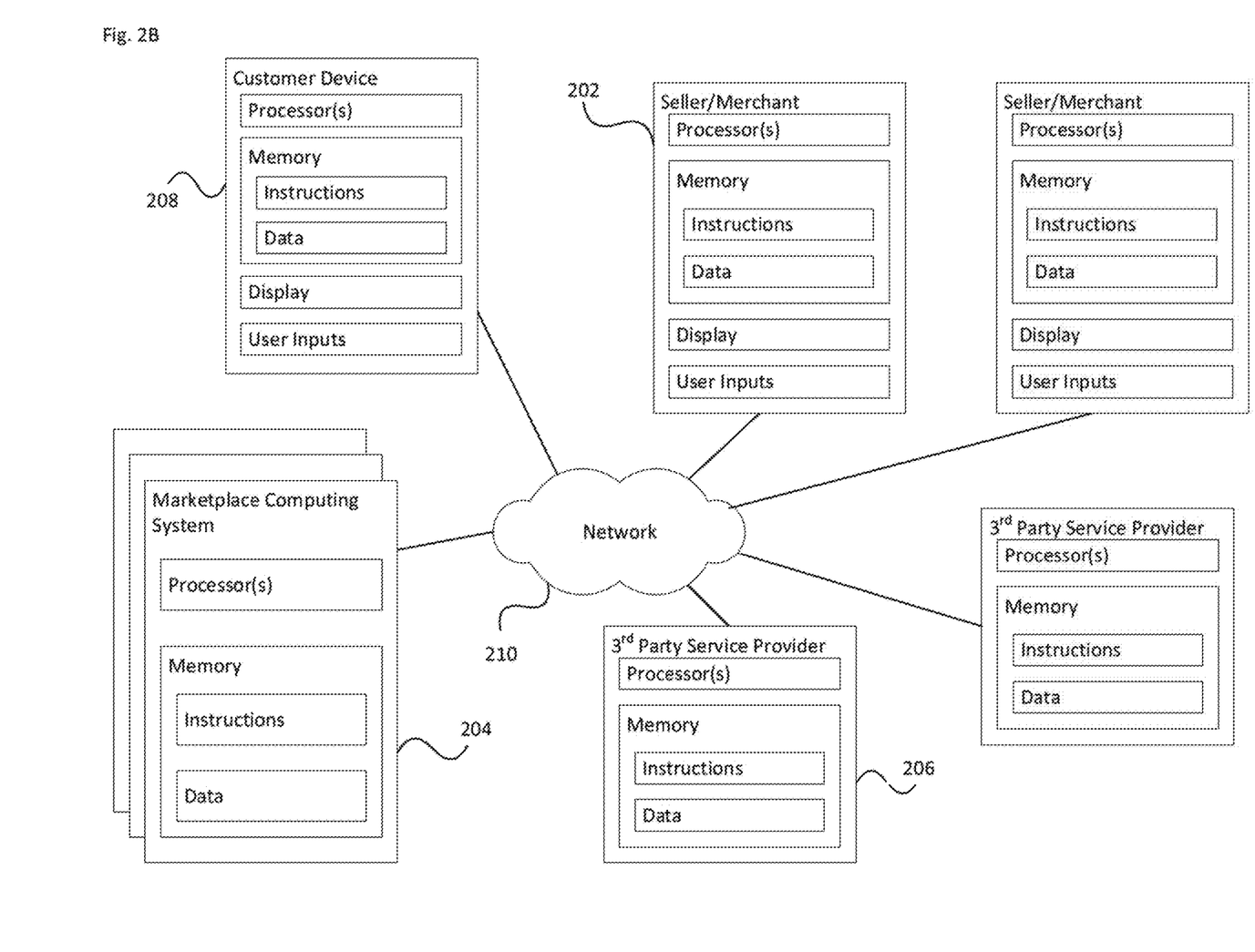

FIGS. 2A-B illustrate an example system that includes merchant devices 202, a marketplace computing system 204, third party systems 206 and customer devices 208, which may be connected directly or indirectly via network 210. While only a few devices are shown, there may be many (e.g., hundreds or thousands) merchant devices, customer devices and third party systems. As illustrated in FIG. 2A, the merchant devices 202 may be desktop or laptop client computer devices, although other types of computers may be employed. The marketplace computing system 204 may be a server system of one or more computing devices, as discussed below. The third party systems 206, such as search engines 106, social networks 108 and/or content services 110 of FIG. 1, may be server-type systems. Customer devices 208 may include, by way of example, mobile phones, tablet PCs, smartwatches or other wearables, laptops, netbooks, desktops, etc. As shown in FIG. 2B, each of these devices may include processors and memory for storing instructions and data. The merchant and customer devices may also include UI components to receive user inputs and present information to a person, for instance via one or more display devices.

Figure 3A:
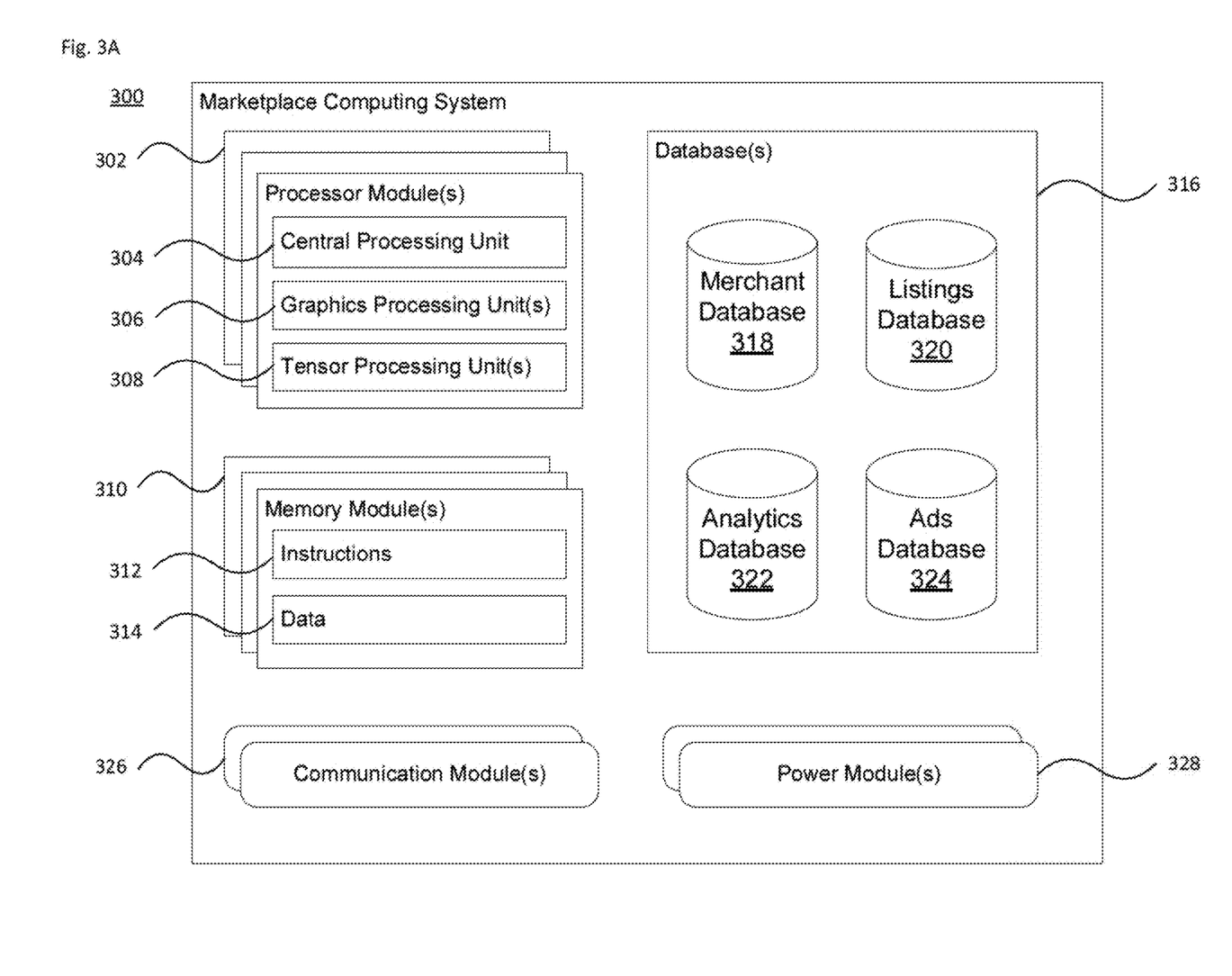
FIGS. 3A-B illustrate an example marketplace computing system in accordance with aspects of the disclosure.
Figure 3B:
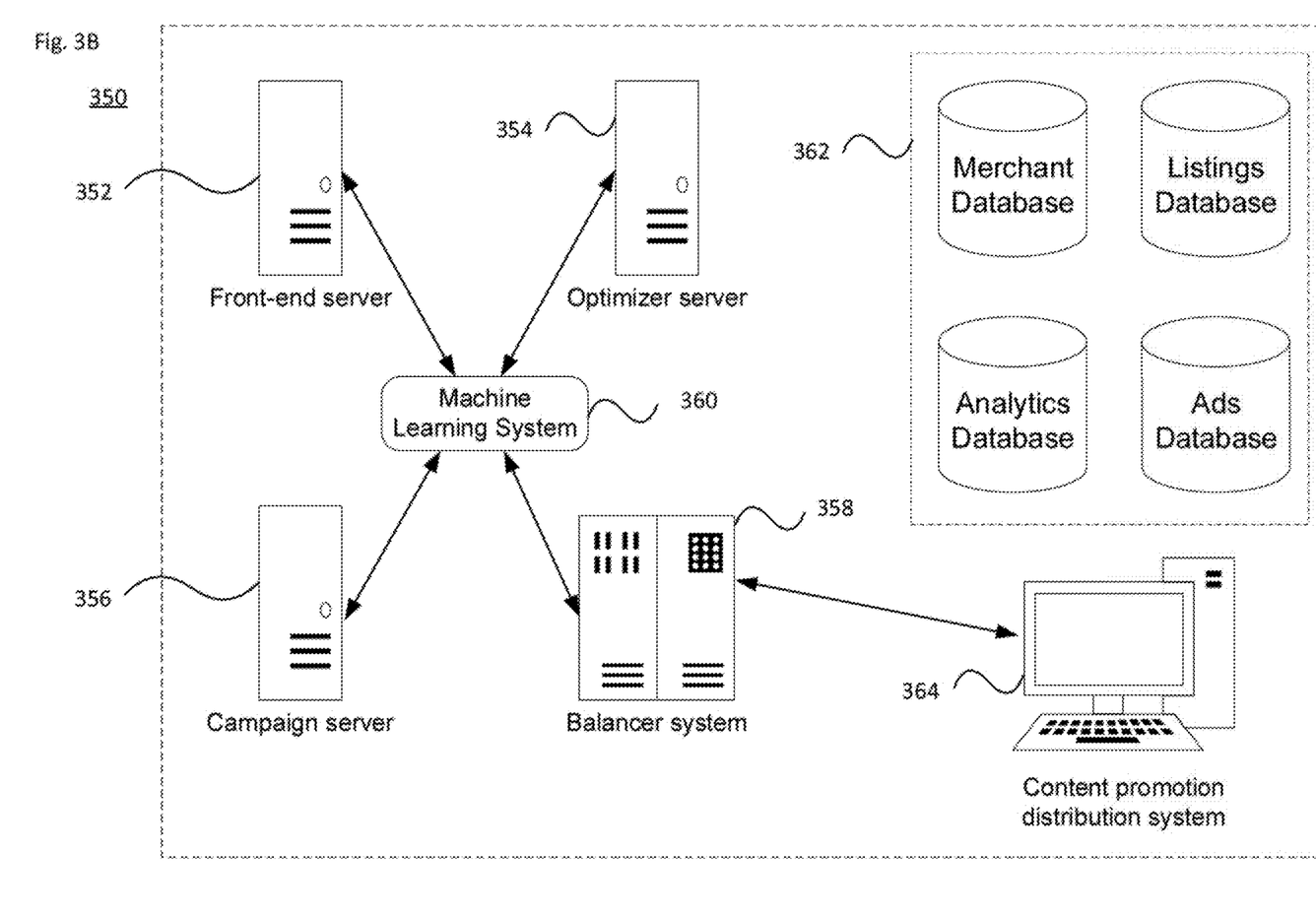

FIGS. 3A-B illustrate example arrangements of marketplace computing systems 300 and 350, respectively. As shown in the arrangement of FIG. 3A, the marketplace computing system 300 may be a server-type system that may be employed with the techniques disclosed herein. Here, the server system includes at least one processing module 302 that has a set of computer processors. The set of processors may comprise, e.g., a central processing unit (CPU) 304, graphics processing units (GPUs) 306, and/or tensor processing units (TPUs) 308. One or more memory modules 310 are configured to store instructions 312 and data 314.

The processors may be configured to operate in parallel. Such processors may include ASICs, controllers and other types of hardware circuitry. The memory module(s) 310 can be implemented as one or more of a computer-readable medium, a volatile memory unit, or a non-volatile memory unit. The memory module(s) 310 may include, for example, flash memory or NVRAM. These module(s) may be embodied as one or more hard-drives or memory cards. Alternatively, the memory module(s) 310 may also include optical discs, high-density tape drives, and other types non-transitory memories. The instructions 312, when executed by one or more processors of the marketplace computing system, perform operations such as those described herein. Although FIG. 3A functionally illustrates the processor(s), memory module, and other elements of the marketplace computing system 300 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip. The system may be implemented in a cloud-based shared infrastructure, with specialized server and processor types such as one or more processor clusters reserved to expedite certain key tasks such as machine learning, data optimization, or content distribution.

The data 314 may be retrieved, stored and/or modified by the processors in accordance with the instructions 312. Although the claimed subject matter is not limited by any particular data structure, the data may be stored in computer registers, in a relational database as a table having a plurality of different fields and records, a data stream processed in real time, XML documents, etc. The instructions 312 may be any set of instructions to be executed directly, such as machine code, or indirectly, such as scripts, by one or more processors.

In this type of arrangement, the different modules and systems of the marketplace 104 of FIG. 1 may be implemented by the processor modules 302 and the instructions 312 and data 314 of the memory module(s) 310, in accordance with information stored in the database(s) 316, as well as any information received from merchants, service providers and customer devices.

One or more databases 316 may be stored in the memory module(s) 310 or stored in separate non-transitory memory. In one example, the databases 316 include a merchant database 318, a listings database 320, an analytics database 322 and an advertising database 324. While the databases are shown as being part of a single block, the information for each database may be stored in discrete databases. The databases may be distributed, for instance across multiple memory modules or other storage devices of a cloud computing architecture. The databases may be run, depending on scale, via a number of different frameworks, including, for example, traditional query languages such as MySQL, big-data Hadoop clusters, or stream processing.

As also shown FIG. 3A, the marketplace computing system 300 includes one or more communication modules 326 for communicating with other devices and systems, including merchant devices, customer devices, service provider devices and other devices in the network. The communication module(s) 326 may include one or more wireless transceivers, and/or one or more wired transceivers. The marketplace computing system 300 may communicate with remote devices via the communication module 326 using various configurations and protocols, including but not limited to local area network (LAN) and/or wide area network (WAN) configurations. Various standard protocols, such as 802.3 (Ethernet) and 802.11 (wireless LANs) may be employed, although these are nonlimiting examples. In addition, the marketplace computing system 300 as shown also includes one or more power module 328. The power module(s) 328 are configured to supply power to the other modules of the marketplace computing system 300.

FIG. 3B illustrates an alternative arrangement 350, in which the different modules of FIG. 3A may be implemented across different servers or other computing configurations. Here, front end server 352 may support website and/or mobile app platforms. Optimizer server 354 may handle optimization for individual merchants, one or more groups of merchants, and/or the marketplace platform as discussed above regarding subsidy optimizer module 114. Campaign server 356 is configured to manage merchant campaigns as discussed above regarding campaign module 116. Balancer system 358 determines the overall content budget for the merchant(s) and the marketplace, as discussed above regarding budget balancer 118. As explained above with regard to system 120, machine learning system 360 employs information from the various parts of the marketplace computing system to create clusters and other information, which is used by the optimization server and balancer system when planning or modifying augmented merchant campaigns. As discussed above with regard to FIG. 3A, one or more databases 362 may store information about merchants, listings for sale, promotional content such as advertising, and analytics information. Finally, content promotion distribution system 364 may implement the functionality and operations of the content distribution module 128 and the on-platform content system 130. While not shown, in this arrangement each component may have its own communication module and power module, or those resources may be shared among multiple components.

By way of example, the servers and systems of FIGS. 3A-B may be arranged in a distributed architecture employing one or more processor clusters. In the distributed architecture, the marketplace computing arrangement may comprise multiple server units that are part of one or more server farms. This may include a cloud computing configuration. Whether in a unitary or distributed architecture, the functionality of the various modules and components is the same unless described differently herein. The service providers may have processing systems, memory modules and other components similar to those described above.

Figure 4:
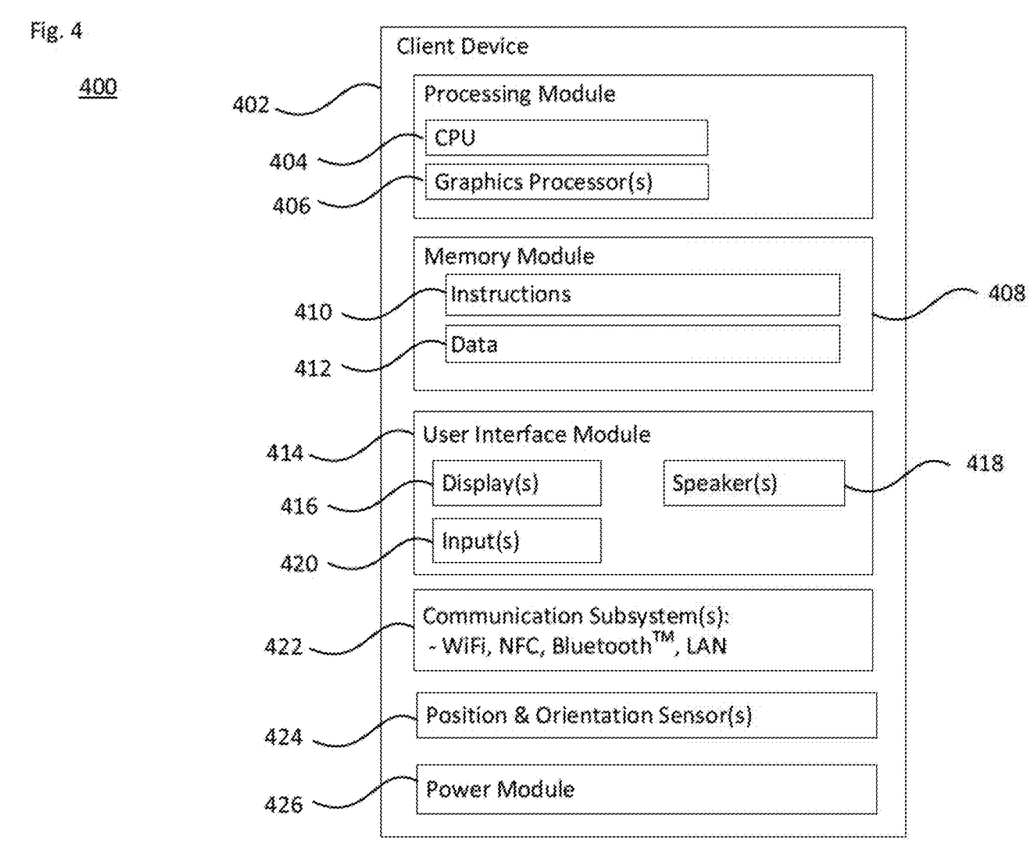
FIG. 4 illustrates and example client device for use with aspects of the disclosure.

FIG. 4 illustrates an example client device 400 that way be employed with the techniques disclosed herein. The client device may be, a merchant device 202 or a customer device 208, such as shown in FIGS. 2A-B. Similar to the marketplace computing system 300, the client device 400 includes a processing module 402. The processing module may comprise one or more computer processors such as CPU 404 and/or graphics processor(s) 406. The client device also includes a memory module 408 that stores instructions 410 and data 412. The processors may or may not operate in parallel, and may include ASICs, controllers and other types of hardware circuitry. The memory module 408, instructions 410 and data 412 can be implemented as described above with regard to the marketplace computing system.

The processors are configured to receive information from a user through user interface module 414. The processors are also configured to present information to the user, for instance via display devices 416 and/or speakers 418 of the user interface module 414. User interface module 414 is able to receive commands from a user via user inputs 420 and convert them for submission to a given processor. The user inputs may include one or more of a touch screen, keypad, mouse, stylus, microphone, etc. The display(s) 416 may comprise appropriate circuitry for driving a display device to present graphical and other information to the user. By way of example, the graphical information for a browser or other application may be generated by the graphics processor(s) 406, while CPU 404 manages overall operation of the client device 400. The graphical information may include responses to user queries. For instance, the processing module 402 may run a browser or other application using the instructions 410 and data 412 stored in the memory module 408, and present information associated with the browser to the user via the display 416 and speakers 418.

As also shown in FIG. 4, the client device 400 includes a communication module 422 for communicating with other devices and systems. The communication module 422 may include a wireless transceiver (or separate transmitter and receiver) and/or a wired transceiver. By way of example, the client device 500 may communicate with other remote devices via the communication module 422 using various configurations and protocols, including short range communication protocols such as near-field communication (NFC), Bluetooth™, Bluetooth™ Low Energy (LE) or other ad-hoc networks, LANs, WANs or any combinations of the foregoing.

In addition, the client device 400 may include one or more position and orientation sensors 424. The position and orientation sensor(s) 424 is configured to determine the location and orientation (e.g., pose) of the client device 400. For example, such components may include a GPS receiver to determine the device's latitude, longitude and altitude. They may also include an accelerometer, gyroscope or another device configured to detect a direction of movement and speed. The client device 500 includes a power module 426 to supply power to the other components of the device.

Example Implementations

As noted above, merchants may implement campaigns to promote their goods or services via different platforms, including the marketplace platform. According to one aspect, the marketplace can aid merchants with their campaigns, for example by augmenting promotional budgets on selected platforms. This benefits the merchants by providing enhanced visibility for the listings, which can also directly or indirectly benefit the marketplace.

In one scenario, the merchants provide information about their campaigns to the marketplace, along with a merchant advertising budget or outcome-related goal. Based on this information, the marketplace may select one or more merchants or one or more sets of goods/services to promote in a manner that stands in for or supplements the merchant(s) campaigns. For instance, the marketplace can identify one or more clusters of products to promote via multiple platforms. The marketplace sets an overall content budget that includes budget contributions from the merchant(s) and from the marketplace. It also selects how the budget will be spread across the platforms in accordance with goals of the merchant(s) and the marketplace. In view of this, the marketplace handles content distribution, such as advertising and other promotional information, to each of the selected platforms according to the respective budget allocations. The marketplace is able to receive campaign results and other analytics information from each external platform. Some or all of the results and analytics may be provided to the merchants to evaluate the effectiveness of their campaign. Merchants may be invited by the marketplace to participate in a supplemental promotional campaign, or otherwise be required to opt into or out of such a program.

Figure 5:
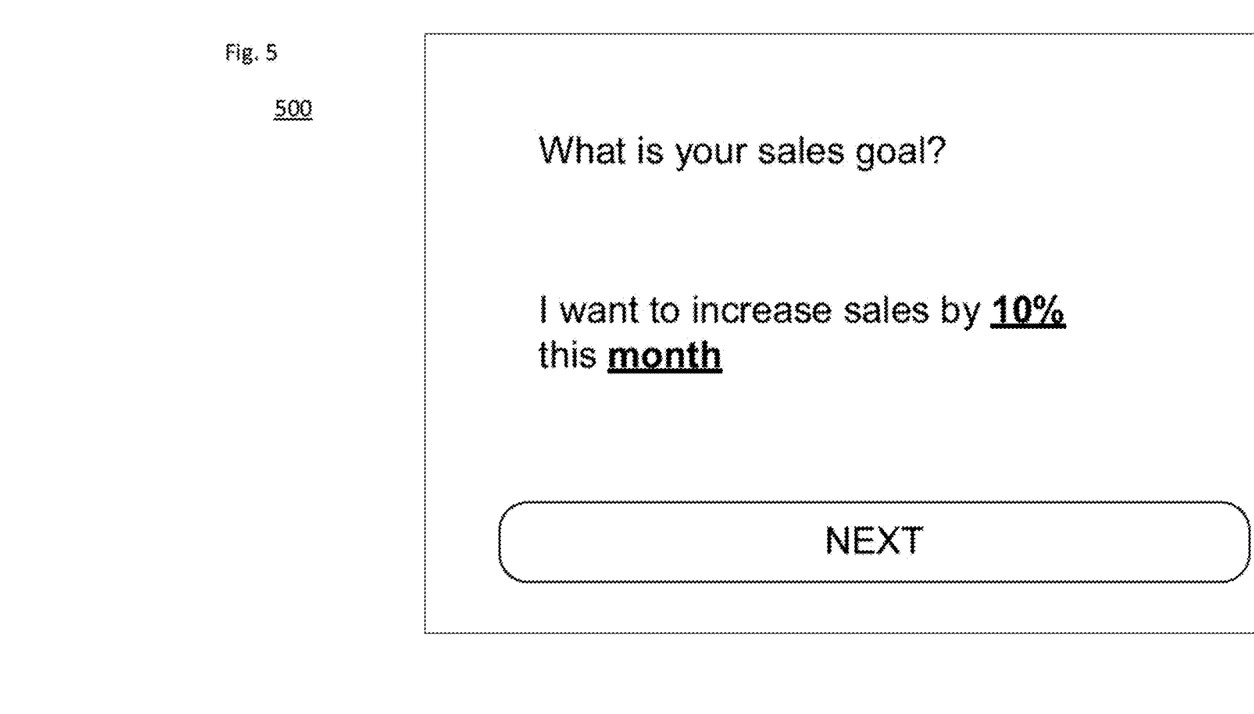
FIG. 5 illustrates a graphical user interface screen in accordance with aspects of the disclosure.
Figure 6:
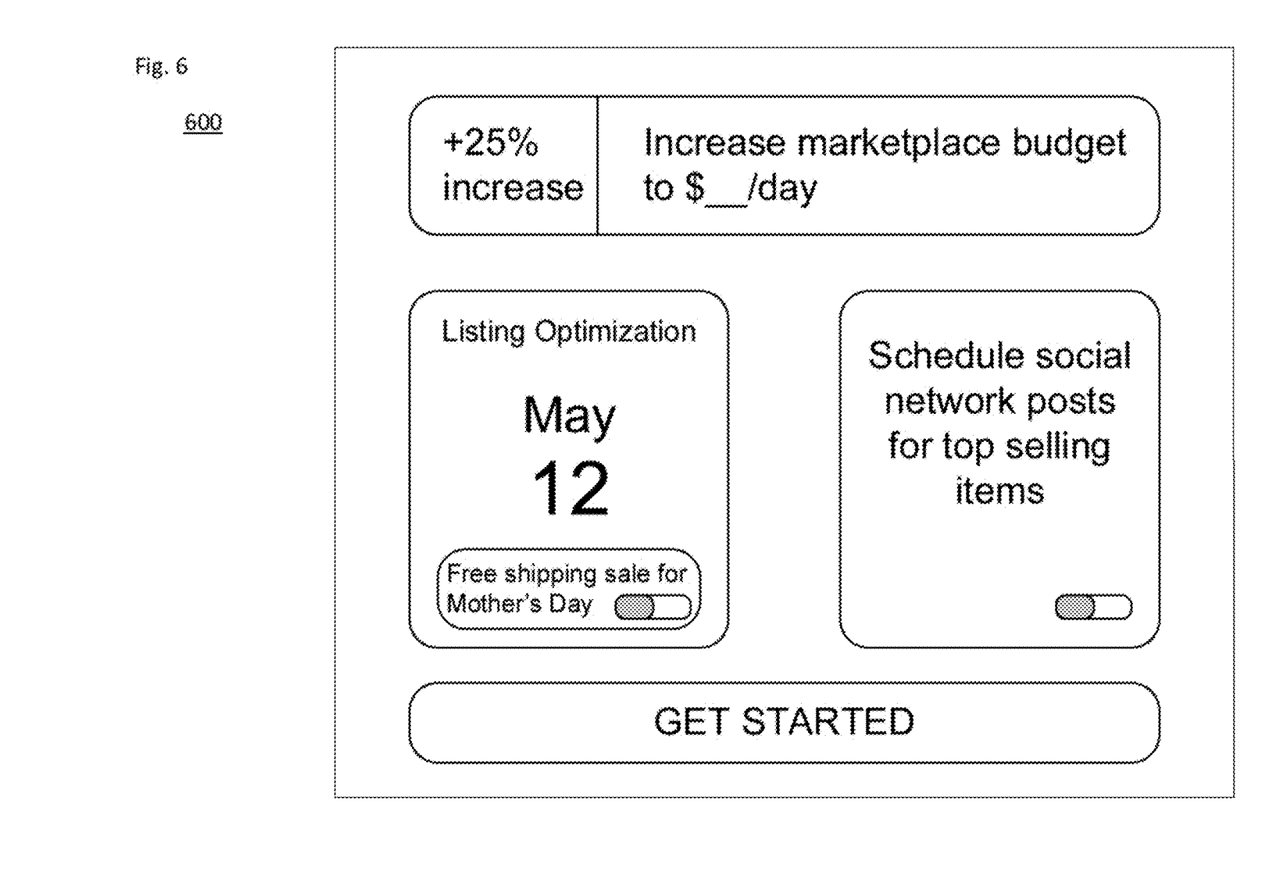
FIG. 6 illustrates another graphical user interface screen in accordance with aspects of the disclosure.

The marketplace may receive the merchant campaign information using the campaign module 116 of FIG. 1, e.g., via front end module 112. FIGS. 5 and 6 illustrate exemplary screens that may be displayed to a merchant on the web browser of their client device. For instance, FIG. 5 presents a UI that requests the merchant's sales goal. The goal may include a percentage or absolute value increase (e.g., 10%, 25%, $500, $10,000, etc.), as well as a timeframe (e.g., 1 day, 1 week, 1 month, for a particular holiday). FIG. 6 illustrates another UI that includes more specific information. This UI may identify a percentage increase and/or an absolute dollar increase in the budget for the marketplace (or other platform) on a daily or other timeframe. Here, the UI may also indicate which day(s) to optimize the promotion (e.g., on Mother's Day). In addition, the UI may offer the merchant the option to schedule posts for certain items on social networks or other service providers.

Once the campaign module obtains the information from the merchant regarding the merchant's goals, budget and related information, the marketplace is able to determine whether and how to supplement the merchant's campaign. For instance, the subsidy optimizer module 114 determines which items to promote for a single merchant or a group of merchants. This is determined in accordance with the platforms on which the items will be promoted. And the budget balancer module 118 determines an overall content budget for a given campaign. This includes budgets from both the merchant(s) and the marketplace, and how those resources will be applied across the platforms.

In one example, the campaign may be associated with only a single merchant. Here, the merchant may select one, some or all of its items for promotion, indicate sales goals, identify platforms of interest, etc., and provide that information to the marketplace via the campaign module 116. The subsidy optimizer determines how to split the promotion across the platforms. The budget balancer determines how the overall budget will be applied to the platforms. The spend for each of the merchant and the marketplace may be proportionally the same. For instance, if 30% of the budget will be used on the marketplace platform, 40% will be used on a social network platform and 30% will be used on a search engine platform, this 30/40/30 split may be applied to the individual budgets from both of the merchant and the marketplace. However, the budget balancer may apply an unequal allocation. In this case, while the merchant's individual budget may be split 30/40/30 as above, the marketplace's individual budget for those same platforms may be split 50/30/20 based on analytical review of optimal allocation of budgets. With a new merchant or other user of the augmented system, the budget balancer may apply default budget splits between the various platforms. For instance, when there are only two platforms, the default split may be 50/50. These splits and percentages are merely exemplary.

In another example, the campaign may be associated with a set of merchants. The merchants may belong to a common "vertical", e.g., meaning that they belong to a common industry or sell similar types of products. Merchants may also be grouped together because they are considered to be of the same or similar "tier", such as high volume or high dollar merchants, are ranked similarly based on customer feedback, and/or according to other criteria. A given merchant may belong to one or more clusters, as shown by groups 124 and 126 of FIG. 1. By way of example only, in a given cluster a first merchant (jeweler) may sell jewelry, a second (florist) may sell flower arrangements, and a third (chocolatier) may sell high quality chocolates. Here, one or more parts of the marketplace, such as the machine learning system, may identify that these merchants should be clustered together for a Valentine's Day or Mother's Day campaign.

As in the preceding example, each merchant may select which of its items to promote, and provide other relevant information via the campaign module. Here, the subsidy optimizer determines how to split the promotion across the platforms and the budget balancer determines how the overall budget will be applied to the platforms for the entire set of merchants. Each merchant's portion of the overall budget may be split the same way among the platforms. Alternatively, the portions may not be weighted equally. Similarly, the marketplace's portion of the overall budget may be distributed evenly or unevenly among the platforms. And the marketplace's portion may be allocated differently for some or all of the merchants.

Thus, using the scenario above, if 30% of the budget will be used on the marketplace platform, 40% will be used on a social network platform and 30% will be used on a search engine platform, this 30/40/30 split may be applied to the individual budgets from all of the merchant as well as the marketplace. However, the marketplace's individual budget may be split 50/30/20 (or some other ratio). Here, the marketplace's split may apply equally for all of the merchants in the set. Or the marketplace's split may vary for different merchants. Thus, in the situation where there are two merchants in the set, the marketplace split for one merchant may be 20/60/20, while the split for the other merchant may be 70/10/20. As above, these splits and percentages are merely exemplary.

Once the platforms have been selected and the overall budget allocated accordingly for a given campaign, the content promotion distribution system of the marketplace provides advertising information and/or other content for presentation on the selected platforms. For instance, content distribution module 128 of FIG. 1 may direct individual requests to display promoted content to the on-platform content system 130 as well as to one or more service providers. This may include directing the requests to multiple ad servers. The on-platform content system 130 may retrieve relevant content from one or more databases of the marketplace, such as the ads database shown in FIG. 3B. Off-platform ad servers may retrieve relevant content from other databases associated with the respective service providers.

The budgeting may be modified during the campaign. For instance, ROAS and/or various conversion metrics may increase over time, indicating an increase in customers purchasing the promoted items. In response to such increases, the marketplace portion of the overall budget may be decreased. This decrease may include reducing a percentage or absolute dollar amount for one or more of the platforms. Or the marketplace portion may remain the same in the aggregate, but be rebalanced by the budget balancer and/or the subsidy optimizer to increase spend on a first platform while decreasing spend on a second platform. Alternatively, the marketplace budget may be increased in a way that increases the overall budget.

In one scenario, marketplace budget rebalancing may be done incrementally, for instance by changing no more than 1-10% of that budget over a given period of time (e.g., daily or weekly). Upon initially setting the overall budget or after a rebalance, the system may choose to hold off on further rebalancing for a selected period of time (e.g., 12 hours, 1 day, 1 week, 1 month, etc.). In another scenario, the marketplace budget may be rebalanced in response to one or more merchants modifying their budget(s) during the campaign. And in a further scenario, the marketplace budget may be rebalanced in response to a change in the status of a merchant. For instance, if a merchant's tier changes from an average merchant to a top merchant, or vice versa, the marketplace budget for that merchant may be adjusted upward or downward for one or more platforms.

Alternatively or in addition to budget modification and rebalancing, the marketplace server system (e.g., via subsidy optimizer 114) may hold some portion of the spend to be a fixed amount while adjusting another portion of the spend across selected platforms. For instance, the subsidy optimizer may select X % of the spend (e.g., between 70-95%, of more or less) to remain fixed across the set of platforms, while Y % of the spend (e.g., between 5-30%, or more or less) is varied across some or all of the platforms. This will allow the marketplace server system to evaluate yield curves or variances (via a differential analysis, for example) for different platforms and provide a more robust set of data regarding ROAS. The marketplace server system, e.g., via budget balancer 118 and/or subsidy optimizer 114 way determine which platforms to select for spend reallocation based on analytics and other information about the platforms (such as whether the a given platform is a service provider platform or merchant platform, the type of content provided by a given service provider, target audiences for a given service provider, etc.).

The marketplace system may target opportune times to augment the merchant(s) budget during the campaign. For instance, the marketplace budget may be modified across one or more days leading up to or during a holiday, such as Black Friday, Cyber Monday, Valentine's Day, Mother's Day, Father's Day, etc. Using the above example of the jeweler, florist and chocolatier, the system may rebalance the marketplace budget so that the florist receives a promotional increase in the days just prior to Valentine's Day, the jeweler receives a promotional increase in the days just prior to Mother's Day, and the chocolatier receives a promotional increase in the days just prior to Father's Day. This can include identifying one or more items from a given merchant and rebalancing the marketplace budget to focus attention on such items.

The marketplace budget may also be modified based on jurisdictional criteria. By way of example, certain states may have "tax holidays" during which no sales tax is collected. This may happen, e.g., prior to a new school year, where the sales tax on clothing, footwear, school supplies and the like is suspended. In this case, the subsidy optimizer and/or the budget balancer may rebalance the market budget for one or more selected platforms in a way that focuses on such jurisdictions. Jurisdictional changes may also be done on a country or regional basis.

The marketplace system may be able to track campaign performance before, during and after the use of marketplace-enhanced budgeting, for instance by receiving statistics and other campaign-related information from the relevant service providers. As a result, the system can flexibly modify the overall budget during the campaign by modifying the marketplace budget according to various criteria. While the merchant(s) receive a promotional benefit from this approach, as noted above the amount, allocation and adjustment of the marketplace budget may not be provided to the merchant(s). The merchant(s) may request or otherwise be provided with campaign results and analytics. In this scenario, a given merchant may see that it obtained an enhanced return for its budget spend; however, it may not be able to attribute the enhancement specifically to the marketplace budget allocation(s). Nonetheless, the merchant may understand that augmenting their budget can lead to better conversion and sale results.

The marketplace system may combine the return on advertising spend goals of one or more merchants with goals of the marketplace itself, and modify budgets across merchants, the marketplace, and third party advertising providers by way of subsidies in a manner to achieve a balance of merchants' goals or budgets, and those set by the marketplace's own goals or budgets. For example, if the marketplace has a platform-wide goal of increasing brand exposure by 10%, a subsidy can be calculated and added to a cross-section of merchant budgets for merchants associated with brand lift, thus supporting both the merchants' goals and the marketplaces' goals. In another example, upon analytical ranking of merchant's listings that result in longer browsing or purchasing behaviors on certain third party ad platforms, the marketplace can subsidize those merchant's budgets on those third party ad platforms that maximize the marketplace's browsing time or purchasing frequency goals.

Figure 7:
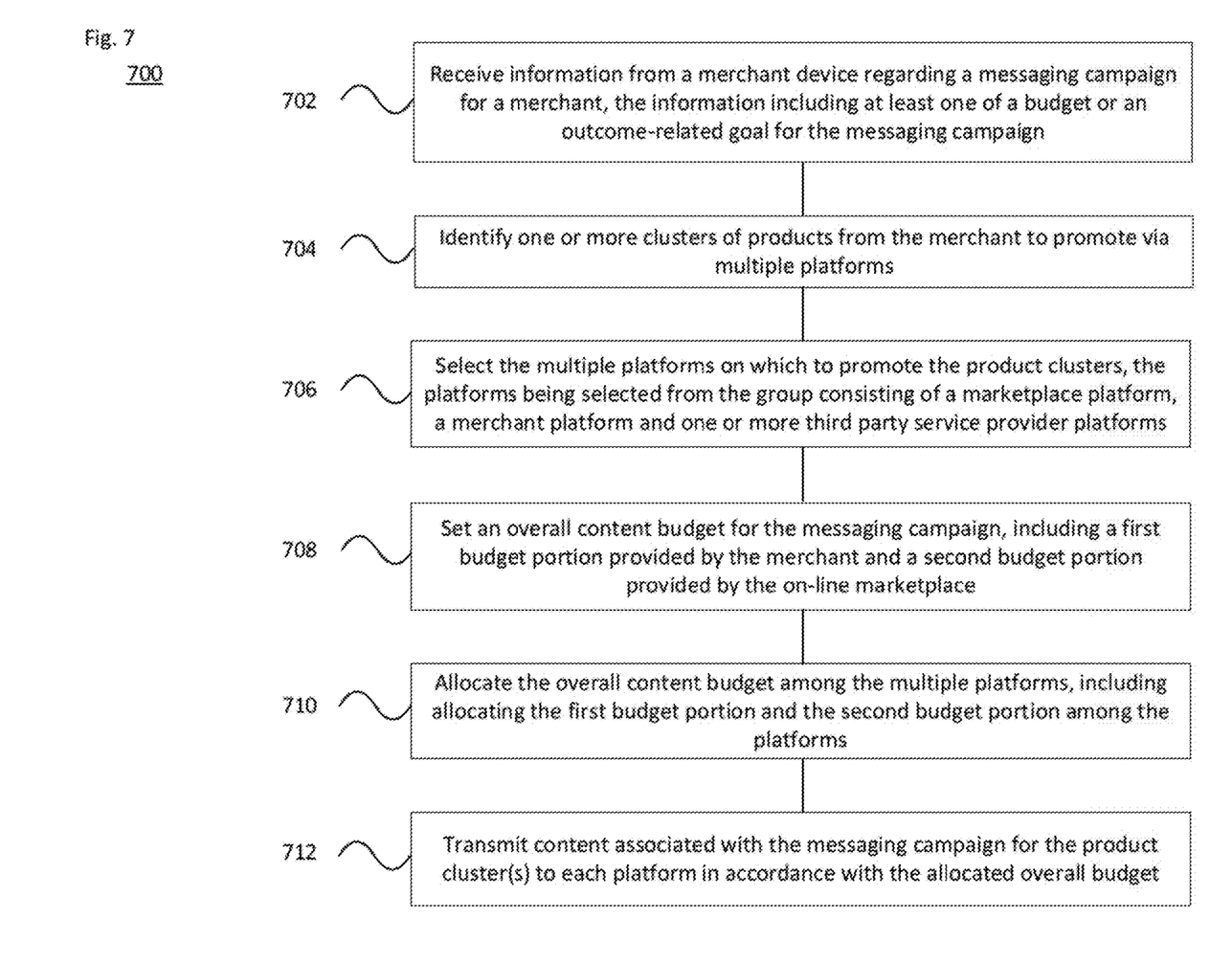
FIG. 7 illustrates a flow diagram in accordance with aspects of the disclosure.

FIG. 7 illustrates a flow diagram 700 of a process for managing promotional content across multiple platforms. The process includes receiving at block 702, e.g., by one or more processors of a marketplace server system of an on-line marketplace, information from a merchant device regarding a messaging campaign for a merchant. The information includes at least one of a budget or an outcome-related goal for the messaging campaign. Information may be received about multiple individual messaging campaigns for different merchants, e.g., from different merchant devices.

At block 704 the process includes identifying one or more clusters of products from the merchant to promote via multiple platforms. Each cluster includes at least one product. By way of example, in the case where more than one merchant has a messaging campaign, a cluster may include the same category or vertical of goods from different merchants. Clusters may also include different categories or verticals, depending on the type(s) of messaging campaigns.

At block 706, the process selects the multiple platforms on which to promote the one or more clusters of products. The multiple platforms are selected from the group consisting of a marketplace platform associated with the on-line marketplace, a merchant platform associated with the merchant, and one or more third party service provider platforms. In one scenario, the marketplace platform is always one of the multiple platforms. In another scenario, at least one of the marketplace platform and the merchant platform are included in the multiple platforms.

At block 708, the process includes setting an overall content budget for the messaging campaign. The overall content budget includes a first budget portion provided by the merchant (or merchants) and a second budget portion provided by the on-line marketplace. Then at block 710 the process allocates the overall content budget among the multiple platforms, including allocating the first budget portion among the multiple platforms and allocating the second budget portion among the multiple platforms. And at block 712, the process includes transmitting content associated with the messaging campaign for the one or more clusters of products to each of the multiple platforms in accordance with the allocated overall content budget.

Unless expressly stated otherwise, the foregoing examples and arrangements are not mutually exclusive and may be implemented in various ways to achieve unique advantages. These and other variations and combinations of the features discussed herein can be employed without departing from the subject matter defined by the claims. In view of this, the foregoing description of exemplary embodiments should be taken by way of illustration rather than by way of limitation.

The examples described herein, as well as clauses phrased as "such as," "including" and the like, should not be interpreted as limiting the subject matter of the claims to any specific examples. Rather, such examples are intended to illustrate possible embodiments. Further, the same reference numbers in different drawings can identify the same or similar elements. The processes or other operations may be performed in a different order or concurrently, unless expresssly indicated otherwise herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. As used in this document, "each" refers to each member of a set or each member of a subset of a set.

To aid the Patent Office and any readers of any patent issued on this application in interpreting the claims appended hereto, Applicant notes that it does not intend any of the appended claims or claim elements to invoke 35 U.S.C. 112(f) unless the words "means for" or "step for" are explicitly used in the particular claim.

The invention claimed is:

1. A method, comprising:
identifying, by one or more processors associated with an on-line marketplace, a set of merchants for a messaging campaign, the set of merchants being associated with one or more products or services;
selecting, by the one or more processors, a plurality of platforms on which to promote the one or more products or services via the messaging campaign, the plurality of platforms including a marketplace platform associated with the on-line marketplace and at least one of a merchant platform associated with the set of merchants or a third party service provider platform distinct from the marketplace platform and the merchant platform;
allocating, by the one or more processors, an overall content budget among the plurality of platforms; and
directing, by the one or more processors, the marketplace platform and the at least one of the merchant platform or the third party service provider platform to implement the messaging campaign in accordance with the allocated overall content budget.

2. The method of claim 1, wherein the overall content budget includes at least one of a first budget portion associated with the on-line marketplace or a second budget portion associated with the set of merchants.

3. The method of claim 2, wherein the second budget portion of the overall content budget includes an individual budget for each merchant of the set of merchants.

4. The method of claim 2, wherein the first budget portion is selectively allocated among each merchant of the set of merchants.

5. The method of claim 2, further comprising modifying the overall content budget by rebalancing the first budget portion to either increase or decrease the first budget portion for selected ones of the plurality of platforms.

6. The method of claim 2, further comprising modifying the overall content budget by rebalancing the first budget portion to either increase or decrease the first budget portion for one or more selected merchants of the set of merchants.

7. The method of claim 2, wherein:
at least one of the first budget portion or the second budget portion has an aggregate value allocated among the plurality of platforms; and
the method further includes rebalancing either the first budget portion or the second budget portion to maintain the aggregate value.

8. The method of claim 1, wherein:
the messaging campaign includes a timeframe for promotion of the one or more products or services; and
the method further comprises modifying the overall content budget during the timeframe.

9. The method of claim 1, further comprising applying a content promotion fee to a selected one of the set of merchants in accordance with one or more metrics.

10. The method of claim 9, wherein the one or more metrics include at least one of a cost-per-click, cost-per-impression, or cost-per-conversion.

11. The method of claim 9, wherein the one or more metrics include a return on advertising spend metric.

12. The method of claim 1, further comprising:
evaluating, by the one or more processors, analytics data about at least one of the set of merchants, a promotion goal associated with the set of merchants, a promotion goal of the on-line marketplace, or one or more factors relating to the products or services;
wherein allocating the overall content budget is based on the evaluating.

13. The method of claim 1, wherein directing the marketplace platform and the at least one of the merchant platform or the third party service provider platform to implement the messaging campaign comprises activating a content promotion service for one or more merchants of the set of merchants.

14. The method of claim 1, wherein the set of merchants is identified based on one or more criteria according to a common vertical association, a merchant tier, or a cluster of merchants.

15. The method of claim 14, wherein the cluster of merchants includes merchants having complementary product categories.

16. The method of claim 1, further comprising modifying the plurality of platforms for the implement the messaging campaign in accordance with one or more metrics associated with the on-line marketplace.

17. A server system of an on-line marketplace configured to distribute content associated with a messaging campaign for one or more merchants across a plurality of platforms, the server system comprising:
at least one database configured to store information including one or more of merchant data, product listings for sale, service listings for sale, promotional content, and analytics information; and
one or more processors operatively coupled to the at least one database, the one or more processors being configured to:
identify a set of merchants for a messaging campaign, the set of merchants being associated with one or more products or services;
select a plurality of platforms on which to promote the one or more products or services via the messaging campaign, the plurality of platforms including a marketplace platform associated with the on-line marketplace and at least one of a merchant platform associated with the set of merchants or a third party service provider platform distinct from the marketplace platform and the merchant platform;
allocate an overall content budget among the plurality of platforms; and
direct the marketplace platform and the at least one of the merchant platform or the third party service provider platform to implement the messaging campaign in accordance with the allocated overall content budget.

18. The server system of claim 17, wherein the overall content budget includes at least one of a first budget portion associated with the on-line marketplace or a second budget portion associated with the set of merchants.

19. The server system of claim 18, wherein the one or more processors are further configured to modify the overall content budget by rebalancing the first budget portion to either increase or decrease the first budget portion for selected ones of the plurality of platforms.

20. The server system of claim 19, wherein the one or more processors are further configured to modify the overall content budget by rebalancing the first budget portion to either increase or decrease the first budget portion for one or more selected merchants of the set of merchants.

21. The server system of claim 18, wherein:
at least one of the first budget portion or the second budget portion has an aggregate value allocated among the plurality of platforms; and
the one or more processors are further configured to rebalance either the first budget portion or the second budget portion to maintain the aggregate value.

22. The server system of claim 17, wherein the one or more processors are further configured to:
evaluate analytics data about at least one of the set of merchants, a promotion goal associated with the set of merchants, a promotion goal of the on-line marketplace, or one or more factors relating to the products or services;
wherein allocating the overall content budget is based on the evaluating.

23. The server system of claim 17, wherein the one or more processors are further configured to modify the plurality of platforms for the implement the messaging campaign in accordance with one or more metrics associated with the on-line marketplace.

\* \* \* \* \*